United States Patent

[11] 3,575,577

| [72] | Inventor | Jeffrey Butler Cunnane<br>Yonkers, N.Y. |
|---|---|---|
| [21] | Appl. No. | 857,913 |
| [22] | Filed | Sept. 15, 1969 |
| [45] | Patented | Apr. 20, 1971 |
| [73] | Assignee | Lunar Electronics, Inc.<br>New York, N.Y. |

[54] SWITCH MODULE
8 Claims, 3 Drawing Figs.

[52] U.S. Cl. .................................................. 200/11,
 200/17, 200/156
[51] Int. Cl. .................................................. H01h 19/58,
 H01h 21/78
[50] Field of Search ....................................... 200/11
 (TW), 12, 17, 18, 156; 235/114, 117, 121, 132,
 137

[56] References Cited
UNITED STATES PATENTS

| 2,924,680 | 2/1960 | Swenson | 200/12X |
| 3,104,299 | 9/1963 | Koci et al. | 200/11(TW)UX |
| 3,182,141 | 5/1965 | Koci et al. | 200/11(TW) |
| 3,193,629 | 7/1965 | Losch et al. | 200/11 |
| 3,260,806 | 7/1966 | Jeans | 200/11(TW) |
| 3,375,337 | 3/1968 | Barrett et al. | 200/11(TW) |
| 3,470,334 | 9/1969 | De Robertis et al. | 200/11(TW)UX |
| 3,499,127 | 3/1970 | Cherry et al. | 200/11(TW)UX |

Primary Examiner—J. R. Scott
Attorney—George M. Gould

ABSTRACT: A switch module which provides power-on selective switching between an input channel and a plurality of output channels without contact of channels which lie in sequence between the in-use and the desired channel. The switch module utilizes a radial moving lever containing a contact strip to effectuate switching from standby to encoding mode on an enclosed encoding circuit element. Interchannel switching is accomplished only when the lever is in the standby mode position with regard to the encoding circuit element. The switch module is useful in programming of automated equipment.

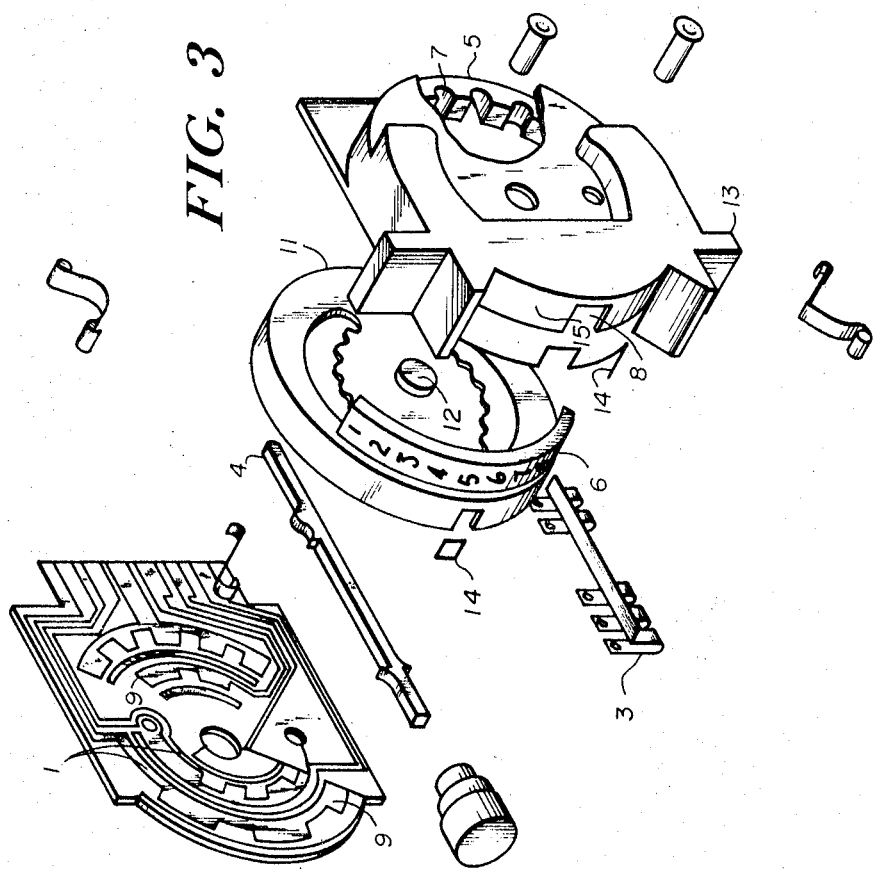
INVENTOR
JEFFREY B. CUNNANE
BY
George M. Gould
ATTORNEY

SWITCH MODULE

BACKGROUND OF THE INVENTION

The rapid technological advance in design and operation of automated devices has brought with it the concommitant necessity to develop efficient, easily usable and trouble-free equipment for programming such automated devices. A highly important element in such programming equipment is the programming circuit selector switch which is generally in modular form and arrayed in selectable number in the programming console.

Several types of programming selector switch modules have recently been developed. One such type is the thumbwheel switch wherein an operator selects the desired digital value by rotating the switch while the programming equipment is maintained on a standby mode by means of external circuitry which isolates said switch electrically from said programming equipment.

Thus, intermediate switch values are not fed into the device being programmed while the thumbwheel switch is in transit between desired channels. However, additional operator actions are required for each cycle in switching modes. This type of switch suffers from an additional disadvantage in that one operator action is required for each channel which lies serially between the in-use channel and the desired channel. Therefore, it may be said that said thumbwheel switch may require up to 12 operator actions to switch from the first channel to the tenth channel.

A second type of programming selector switch module is a pushbutton switch wherein consecutive activations of the button moves the switch serially through the channel positions. Improved versions of this switch employ dual buttons for forward and reverse progressions of channels to lessen the number of activations necessary to get to a desired channel. Thus, in spite of the positive advantages of facile in-line readout and dust proof interior construction made possible by this type of switch, residual inherent disadvantages remain. These include excessive operator functions to change channels and the necessity of having to convert to a standby mode externally during switching of channels.

Yet another type of programming circuit selector switch module utilizes a sliding switch handle and a nonconductive interchannel conduit. The main feature of this switch type is the ability to move from one channel to another without having to separately switch to a standby mode and effecting this change in channels without passing through intermediate channels. Disadvantages stemming from this type of switch include the inability to have in-line readout of channel position. Due to the slide feature the interior portion of the switch, particularly the encoding circuits, are open to the atmosphere and thus will be exposed to dirt and moisture thereby jeopardizing extended efficient operation.

It is thus seen that in the present state of the art no single switching module available incorporates all the indicated advantages of power-on switching, ease of operation, in-line readout and dirt and moistureproof construction. Incorporation of such features into a single switch module design would thus represent a substantial contribution to the progress of this art.

SUMMARY OF THE INVENTION

The present invention relates to an improved programming circuit switch module useful in programming automatic equipment. These modules may be used individually or in multiple array to provide flexible operation. Unique features of construction in the present switch modules provide distinct operating advantages such as random power-on switching, ease of operation, facile in-line readout and dirt and moistureproof construction. Additionally, the module of the present invention can utilize a variety of encoder circuits thus providing selection of outputs including, for example, decimal, binary or binary with complement outputs, among others.

The subject switch module comprises two essentially circular housing elements which in preferred embodiments may be constructed from molded plastic, e.g., polyethylene, polypropylene, polystyrene, or the like. The housing elements are mounted in a manner providing rotation of the elements relative to each other, e.g., by mounting the two elements on a common pivot or axle structure.

The first of the housing elements contains a series of spaced lever means support means on the inward side of the housing element's periphery. In preferred embodiments these lever means support means correspond to a series of inwardly opening notches in the aforesaid housing element's periphery.

The aforesaid housing elements have essentially hollow interiors so when they are mounted in rotational relationship to each other a central chamber area is formed.

The switching action in the present device is obtained by means of a lever arm slidably mounted through the second housing element which is opposed to the one having the lever means support means.

Thus, the lever arm may be freely moved in a radial direction. When the lever arm is moved inwardly, towards the center of the housing element, the inward end of the lever arm engages one of the notches in the opposing side of the other housing element. In this position rotatability of the two housing elements is retarded. Outward radial movement of the lever arm disengages the lever arm from the notch and allows relative rotation between the housing elements until a new desired position is achieved whereupon the lever arm is again engaged with another notch by inward motion. In preferred embodiments a snap-over-center-type spring detent means mounted on said second housing element is used to retard radial motion of the lever arm until predetermined force is applied inwardly or outwardly. This serves to retard accidental radial motion of the lever arm thus minimizing undesirable arcing between the lever arm contacts and the encoding circuit elements.

Readout information is given by means of a readout mechanism consisting of a rotor element on the periphery of said first housing element, said rotor element defining a minor arc of the circumference of said housing element. Numerals are serially imprinted on the outer surface of the rotor element. Generally, a decimal readout will be employed although any other serial indicating system may be utilized. Indication of the input numeral is obtained by employing a readout window means on the second housing element's periphery. In a preferred embodiment the readout window means comprises an opaque mask element having a window space cut therein. The readout window means is shaped in a curve and is constructed to overly the rotor element with each of said numerals on said rotor singly and serially registering in said window as the housing elements are subjected to relative rotation. It is understood that each number that registers in the readout window will correspond to a specific lever arm engaging position in the said notches. Selection of a new notch position for the lever arm will occur with rotation of the housing and simultaneous selection of a corresponding numeral in the window.

The essentially circular central chamber formed by said housing elements contains encoding circuit means which in a preferred embodiment comprises a circular printed circuit board. The encoding circuit means is preferably mounted on the central axis of the device, e.g., on the pivot or axis. It is desirable for most flexible use of the switch module that the two housing elements be readily detachable as is the encoding circuit means such as for example by snapping it on or off the central pivot when the housing elements are detached. In this manner the operator can rapidly change the printed circuit to another circuit of different encoding characteristics, e.g., decimal to binary or vice versa. The circuit is preferably of the BCD type.

The lever arm contains a conductive metallic strip element having a plurality of raised contacts extending out from the strip element. These contacts are in physical touch with the surface of the printed-circuit board and register individually with either an encoding or a standby buss which are disposed in concentric circular fashion on the face of the printed-circuit board. The circuit board is constructed in such fashion that the contact elements are in touch with the several standby busses when the lever arm is disengaged from the support notch. However, when the lever arm is in an engaged position in said support notch then the respective contact elements are in touch with the encoding busses on said printed circuit. Thus radial motion of the lever arm moves the contact elements from standby buss to encoding buss. Movement of the lever arm in circular fashion while in disengaged position results in channel selection.

It should be noted that the circuit board is divided into distinct areas which correspond with the respective lever arm positions when the lever arm is engaged in the various notch positions, i.e., each lever position is associated with a distinct arc area of the circuit board and also with a numerical representation in the readout window.

The switch module of the present invention will be more clearly understood by referring to the accompanying drawing.

FIG. 3 is an assembly view of the module switch structure.

Figure 1:
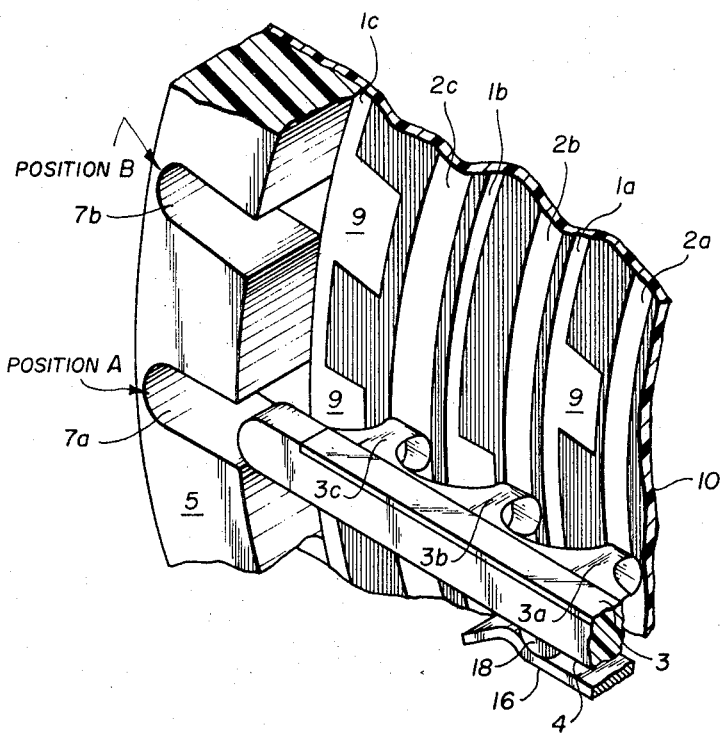
FIG. 1 is a sectional view of the encoding mechanism showing the lever arm, support notches and a section of the printed-circuit board.

In FIG. 1 the inward end of lever arm 4 is shown in disengaged position with respect to notch support 7a in peripheral wall 5 of the housing element (position A). Contact elements 3a, 3b, and 3c are in respective contact with standby busses 2a, 2b, and 2c of printed-circuit board 10 when the lever arm is in the disengaged mode. When lever arm 4 is engaged into notch support 7a then contact elements 3a, 3b, and 3c are brought into respective contact with encoding busses 1a, 1b, and 1c. It is most desirable to provide a boss 18 on one side of the lever arm. The boss will engage spring detent 16 during inward and outward movement of the lever arm. In the embodiment shown, binary coding on the printed-circuit board is provided by the presence or lack of encoding tabs 9 on the encoding busses. The system shown corresponds to a binary coded octal. Other encoding embodiments will suggest themselves to one skilled in the art and can be employed in the practice of this invention. As shown in the subject FIG. Position A corresponds to a binary code of 110 which represents the digit 6. Thus when lever arm 4 is in this position, the readout window would be aligned over the numeral 6 on the rotor element (not shown). Alignment of the circuit board areas with their respective notch positions may be facilitated by providing suitable aligning guides on both elements so that the circuit board can be readily mounted in the proper configuration.

As previously described lever arm 4 is moved to the disengaging position and then rotated to effectuate channel change. Thus reengagement of the lever arm into notch support 7b (position B) will bring the contact elements on the lever arm back from the standby to the encoding mode. In position B the encoding output will be represented by the binary term 101 which represents the digit 5. Thus, the numeral 5 will be represented in the readout window in association with the movement of the lever arm and will inform the operator of the channel input. Complimentary coding may be interspersed between the primary encoding tabs 9 and terminated on the reverse side of the circuit board by means of through plated holes or eyelets (not shown).

Figure 2:
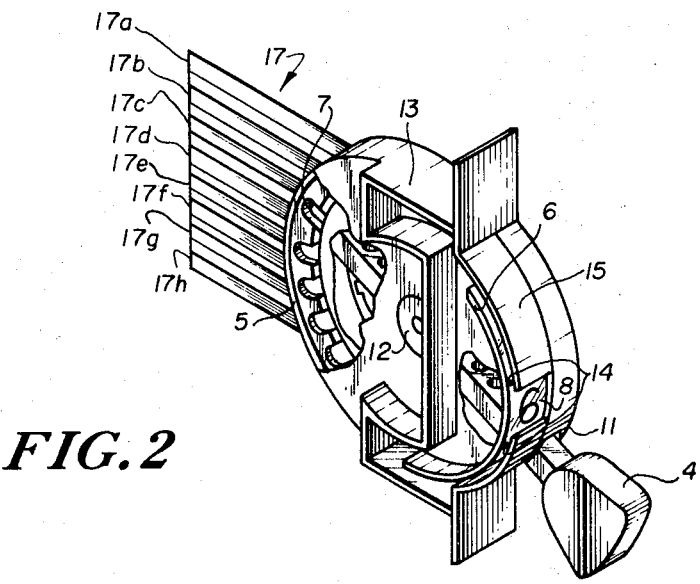
FIG. 2 is a cross-sectional view of the module structure.

FIG. 2 represents a cross-sectional view of the switch module. Lever arm 4 with an optional end handle is mounted through housing element 11 and passes through the center of the module to the opposing side where notch supports 7 are located in peripheral wall 5. Housing element 11 is rotatably mounted with housing element 13 by means of central pivot 12. Readout is provided by rotor element 5 which has numerals printed serially on its outer side (note numeral 6) which register in readout window 8. In order to insure a moisture and dust free interior, seals 14 are interposed on both sides between the window 8 and the rotor element 6 for the entire width of opaque mask element 15. It is understood that additional seals may be introduced between moving elements throughout the switch for this purpose; e.g., between the lever arm and the housing arm between the two housings in conventional fashion.

Terminator strip 17 is shown extending from the housing. This strip is an integral part of the printed-circuit board previously described. The terminator strip carries a series of busses, e.g., 17a—h on its surface which serve as terminations for input and encoding circuits. This terminator may be connected with external circuitry in various manners well known in the art.

I claim:

1. A circuit selector switch module comprising in combination:
    A. a first essentially circular housing means having a plurality of spaced lever means support means located inward of said housing means periphery and further having readout window means at a circumferentially opposed position on said periphery to said support means;
    B. a second essentially circular housing means rotatably affixed to said first housing means whereby an essentially circular central chamber is formed within said housing means, said second housing means containing circumferentially located digit indicia means, said digit indicia means being so arranged and constructed as to register serially with said readout window means when either housing means is rotated;
    C. encoding circuit means mounted in said chamber between said first and second housing means, said encoding circuit means comprising a plurality of spaced standby and encoding circuit element means, and
    D. lever means having circuit contact means mounted thereon, said lever means being mounted in said second housing means, said lever means being so arranged and constructed as to allow radial movement with respect to said second housing means, one end of said lever means being in engaging position with said lever means support means when said lever means are moved in an inwardly radial direction in which position said circuit contact means are in contact with a section of said encoding circuit element means and when said lever means is moved in a radially outwardly position said end of said lever means is disengaged from said lever means support means and said circuit contact means are brought in contact with said standby circuit element means; whereby rotation of said housing elements is possible only when said lever means is disengaged from said lever means support means thereby said circuit contact means contact only the standby circuit element means during rotation.

2. The switch of claim 1 wherein said first housing means contains a rim wall along its periphery and said lever means support means comprise inwardly opening notches in said rim wall.

3. The switch of claim 1 wherein seal means are positioned between said digit indicia means and said readout window means so as to isolate said central chamber from the outside.

4. The switch of claim 1 wherein said encoding circuit means comprises an essentially circular printed circuit having essentially concentric alternating encoding and standby busses.

5. The switch of claim 4 wherein said printed circuit is of the BCD type.

6. The switch of claim 4 wherein said lever means support means are in respective registering position with a distinct arc area of said circular printed circuit so that when said lever is engaged in said lever means support means the said circuit contact means contained thereon are in contact with corresponding encoding busses.

7. The switch of claim 1 wherein said lever means contains a boss on its surface and said second housing means contains a spring detent means in engageable position relative to said boss.

8. The switch of claim 1 wherein said digit indicia means comprises a rotor element having numerals imprinted on its outer side.